April 23, 1957 R. G. ASHTON 2,789,835
VEHICLE SUSPENSION SYSTEM FOR BOAT TRAILERS AND THE LIKE
Filed Dec. 14, 1955 2 Sheets-Sheet 1
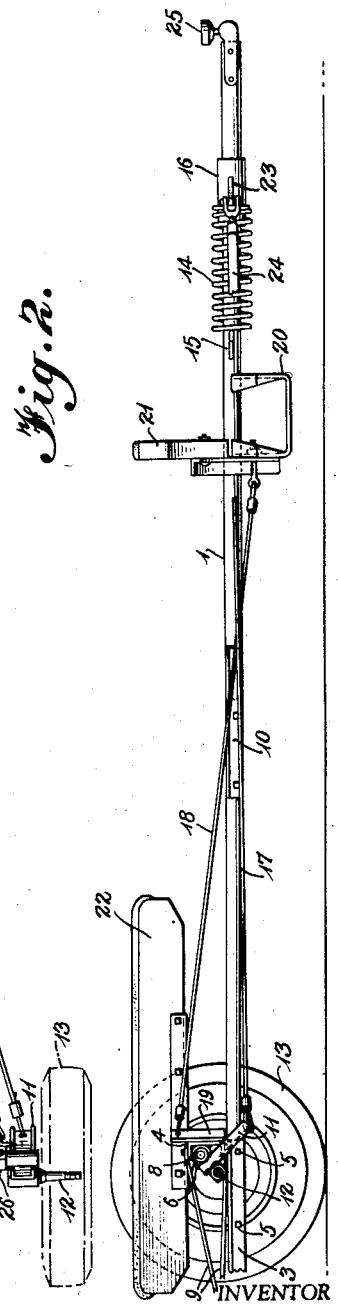
INVENTOR
Richard G. Ashton
BY Stevens, Davis, Miller and Mosher
ATTORNEYS April 23, 1957  R. G. ASHTON  2,789,835
VEHICLE SUSPENSION SYSTEM FOR BOAT TRAILERS AND THE LIKE
Filed Dec. 14, 1955  2 Sheets-Sheet 2
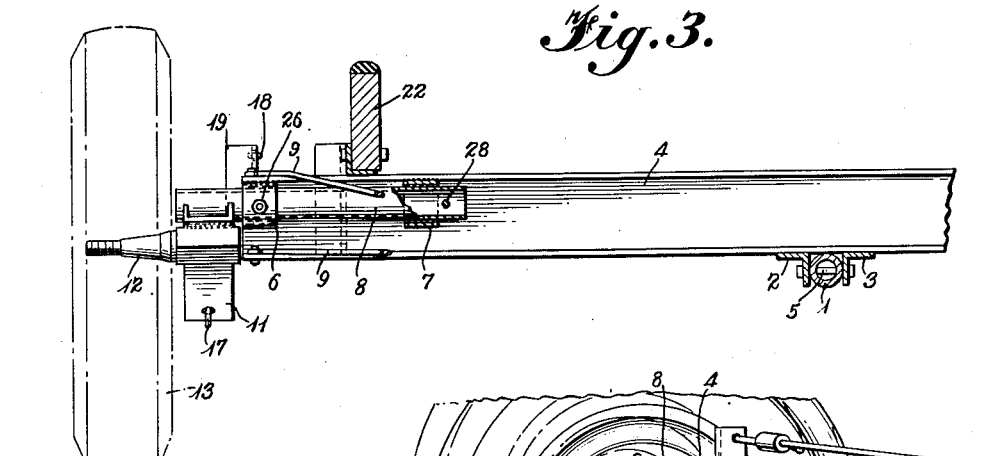
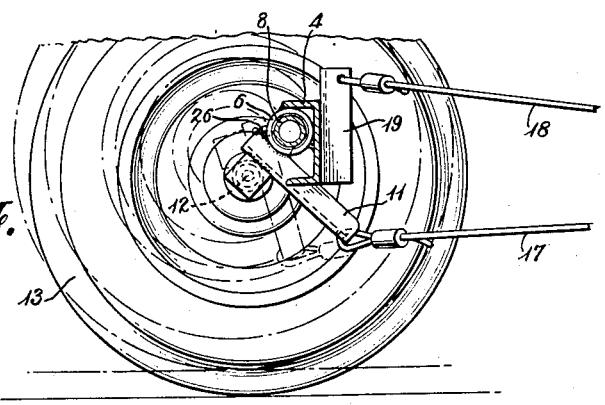
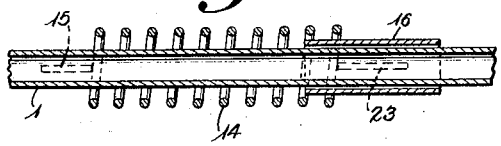
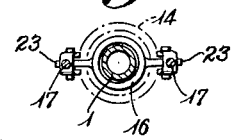
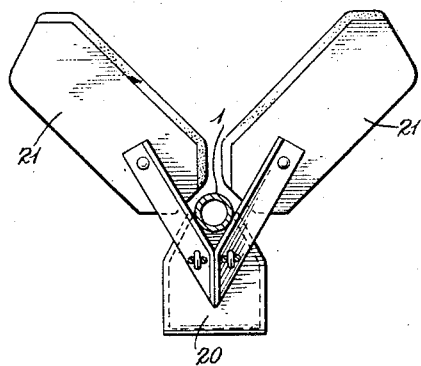
INVENTOR
*Richard G. Ashton*
BY *Stevens, Davis, Miller & Mosher*
ATTORNEYS

United States Patent Office 2,789,835
Patented Apr. 23, 1957

2,789,835

VEHICLE SUSPENSION SYSTEM FOR BOAT TRAILERS AND THE LIKE

Richard G. Ashton, Severna Park, Md.

Application December 14, 1955, Serial No. 553,069

3 Claims. (Cl. 280—414)

This invention relates to a vehicle suspension system, more particularly to a system of spring suspension for boat trailers and similar vehicles.

Past attempts to develop a spring suspension system for trailers have been numerous but unsuccessful. It was found that the addition of necessary springs and equipment to the trailer raised the height of the chassis and tended to make the trailer "top heavy." This condition was further complicated by the spring effect of accentuating the trailer response to any bumps or rough spots in a road. The total result was that a relatively slight deflection upon one wheel was accentuated by the spring suspension, and would easily unbalance the top-heavy trailer. In addition to this very basic failure, proposed systems have added considerably to the weight and cost of a trailer because they have required a separate spring for each wheel as well as related bearing and linkage equipment. None of them achieves the result of this invention having the low center of gravity of the trailer and the load. They have also tended to make the trailer difficult if not impossible to dismount or to adjust to various sizes. Especially in boat trailers which may be used only during certain seasons and for various sizes of boats, it is important that a trailer should be capable of dismounting for storage when not in use.

It is therefore an object of my invention to provide a spring suspension system for a vehicle, which will equalize deflection upon the wheels, thereby maintaining the main frame in a substantially level position.

Another object of my invention is to provide a spring suspension system for a vehicle which will not require the elevation of the main frame usually necessitated by spring suspension systems.

Another object of my invention is to provide a spring suspension system for a vehicle which can be readily dismounted to a more compact arrangement for storage.

Another object of my invention is to provide a spring suspension system for a vehicle in which a single spring functions to absorb shocks from either or both wheels.

Another object of my invention is to provide a spring suspension system which can be applied to vehicle chassis of varying lengths and widths with a minimum amount of adaptation.

Another object of my invention is to provide a spring suspension system for a vehicle which is simple and inexpensive in construction, yet efficient in operation.

Further and other objects will become apparent from the following specification in which like numerals refer to like parts.

In the drawings:

Fig. 1 is a plan view of the vehicle suspension system as applied to a boat trailer;

Fig. 2 is a fragmentary side elevational view;

Fig. 3 is an enlarged sectional view taken at line 3—3 of Figure 1;

Fig. 4 is an enlarged sectional view taken at line 4—4 of Figure 1;

Fig. 5 is an enlarged sectional view taken at line 5—5 of Figure 1;

Fig. 6 is an enlarged sectional view taken at line 6—6 of Figure 1;

Fig. 7 is an enlarged sectional view taken at line 7—7 on Figure 1.

The tow bar 1 is provided at its extreme forward end with any suitable means of attachment 25 to a motor vehicle. Near the center of tow bar 1 is a bolted connection 10 by which tow bar 1 can be separated into two sections. A rearward portion of tow bar 1 is engaged between two attachment arms shown as angle irons 2 and 3 which are fixed to the bottom side of a main frame channel iron 4 and extend rearwardly at right angles from main frame 4. Two removable bolts 5 secure tow bar 1 between attachment arms 2 and 3. A plurality of holes are provided in tow bar 1 for the passage of bolts 5. Different holes can be used to adjust the main frame 4 to different lengths. Steel support rods 9 extend from rearward sections of attachment arms 2 and 3 to the two ends of main frame 4.

Two sleeve bearings 6 and 7 are fixed to the main frame 4 at each of its ends and are provided with grease fittings 26 and 27.

A suspension axle 8 slides through the sleeve bearings 6 and 7 and is held from withdrawal by stop bolt 28. To the portion of the suspension axle 8 which protrudes beyond the main frame 4 is fixed a bell crank arm 11 which extends downwardly from suspension axle 8. The wheel axle 12 is fixed to the side of arm 11 opposite the side to which the suspension axle 8 is fixed. The wheel axle 12 extends outwardly beyond the suspension axle 8 and the arm 11 but parallel to the suspension axle 8. Arm 11 and wheel axle 12 form a bell crank pivoted about the axis of axle 8. Wheels 13 are mounted on the wheel axles 12. A stop 19 is fixed to the forward side of main frame 4 and protrudes beyond main frame 4 so as to intercept and arrest the forward swing of arm 11.

Toward the front of the tow bar 1 a coil spring 14 surrounds the tow bar. It is held from backward move by two fin-shaped spring supports 15 fixed to and protruding from opposite sides of the tow bar. In front of the coil spring 14 and also surrounding tow bar 1 is the slidable spring collar 16 provided with fin-shaped connections 23. It is to be understood that spring 14 may be mounted above or below tow bar 1 so long as it is in position to take a compression load in a direction generally parallel to the axis of the tow bar.

The tow bar 1 is also provided with a ground support stand 20 on its under side and forward chock supports 21 on its upper side. The main frame 4 is provided with hull supports 22 toward each end of its upper side. Ground support stand 20, chock supports 21 and hull supports 22 are all of the types common to boat trailers.

Tension links 17 are fixed to the bottom end of spring arm 11 and extend forwardly to the fin-shaped connections 23 on spring collar 16. A turnbuckle 24, included in the tension links 17, allows for the raising or lowering of the chassis independent of spring load. Fixed tension links 18 extend from the top of stop 19 to the bottom of forward chock supports 21. Both tension links 17 and 18 are readily replaceable by longer or shorter tension links if such is necessary to adjust the trailer to a different length.

The weight of the trailer load is supported by the wheels 13. The eccentric relationship of the axes of members 8 and 12 results in the rearward movement of arm 11. The rearward motion of the arm 11 is transmitted by the tension links 17 to the spring collar 16 which acts against the coil spring 14. Therefore, when the trailer is loaded, the coil spring 14 remains in a partially compressed position. A deflection of either wheel 13 is transmitted to the spring collar which effects a further compression of the coil spring 14, thereby cushioning the shock of the deflection and also causing the same degree of deflection on the other wheel 13. Stop 19 prevents bell crank arm 11 from excessive forward movement. It will be appreciated that the total effect of this inter-action is to cause the trailer to take bumps smoothly and to avoid dangerous leaning by equalizing deflections.

By using the coil spring 14 in a horizontal position as described, it is possible to obtain spring suspension for both wheels with one spring and to maintain a low center of gravity for the trailer chassis.

It will also be seen that by removing bolts 5 from a position of engagement with tow bar 1, detaching links 17 and 18 and sliding suspension axle 8 out of sleeve bearings 6 and 7, the entire trailer can be dismounted and its components more compactly arranged. Furthermore, the tow bar 1 may be separated into two sections at connection 10 and the rear hull supports 22 can be removed from main frame 4.

By the adjustable nature of tow bar 1 at attachment arms 2 and 3 and of the tension links 17 and 18 it is possible to adapt the length of the trailer to various loads and different widths may be obtained simply by using a wider main frame.

It is to be understood that while I have described the preferred embodiment of my invention in this specification, certain changes, alterations, modifications and substitutions may be made by those skilled in the art without departing from the scope of the appended claims.

I claim:

1. A vehicle wheel suspension system comprising a tow bar, a spring support fixed to said tow bar, a main frame secured to said tow bar, a suspension axle rotatably attached at each end of said main frame, a bell crank arm fixed to said suspension axle, a wheel axle fixed to said bell crank arm, said wheel axle and suspension axle having axes in eccentric relationship, a coil spring concentrically surrounding said tow bar, and seated against said spring support, a slidable spring collar concentrically surrounding said tow bar and seated against said coil spring, tension links interconnecting said slidable spring collar and said bell crank arm whereby a change in the position of one wheel axle will be transmitted to said coil spring thereby effecting a corresponding change in the position of the other wheel axle.

2. A boat trailer comprising a tow bar, chock supports on said tow bar, a main frame secured to said tow bar, hull supports on said main frame, a suspension axle rotatably attached at each end of said main frame, a bell crank arm fixed to said suspension axle, a wheel axle fixed to said bell crank arm, said wheel axle and suspension axle having axes in eccentric relationship, a coil spring concentrically surrounding said tow bar, and seated against said spring support, a slidable spring collar concentrically surrounding said tow bar and seated against said coil spring, tension links interconnecting said slidable spring collar and said bell crank arm whereby a change in the position of one wheel axle will be transmitted to said coil spring thereby effecting a corresponding change in the position of the other wheel axle.

3. A wheeled trailer comprising a tow bar, a main frame, bracket means fixed to said main frame, removable means for securing said tow bar to said bracket means, a plurality of wheel axles, positioning means detachably mounting said axles movably on said main frame, said positioning means mounting said wheel axles eccentrically about the attachment to said main frame, a resilient element mounted horizontally with respect to said tow bar and main frame assembly, and tension links interconnecting said positioning means with said horizontally mounted resilient element, means in said tension links to alter length of said tension links, said tension links being readily detachable from said positioning means and said resilient element, means secured above said main frame to support a load.

References Cited in the file of this patent

UNITED STATES PATENTS

| | | |
|---|---|---|
| 1,135,577 | Hague | Apr. 13, 1915 |
| 2,497,072 | Cooper | Feb. 14, 1950 |
| 2,501,974 | Sullivan | Mar. 28, 1950 |
| 2,506,699 | Byrd | May 9, 1950 |
| 2,740,639 | Eckroad | Apr. 3, 1956 |